United States Patent [19]
Grob

[11] 3,858,104
[45] Dec. 31, 1974

[54] DC POWER CONVERTER

[75] Inventor: Russel Walter Grob, Metamora, Ill.

[73] Assignee: Caterpillar Tractor Co., Peoria, Ill.

[22] Filed: May 7, 1973

[21] Appl. No.: 357,870

[52] U.S. Cl. .................. 321/2, 321/18, 323/43.5 S
[51] Int. Cl. ......................................... H02p 13/24
[58] Field of Search ....... 321/2, 18, 47; 323/43.5 R, 323/43.5 S

[56] References Cited
UNITED STATES PATENTS

| | | | |
|---|---|---|---|
| 3,195,036 | 7/1965 | McNulty et al. | 323/43.5 S |
| 3,210,638 | 10/1965 | Walker | 321/18 |
| 3,356,928 | 12/1967 | Parrish | 321/18 |
| 3,514,688 | 5/1970 | Martin | 323/43.5 S |
| 3,593,103 | 7/1971 | Chandler | 321/18 X |
| 3,619,765 | 11/1971 | Wood | 323/45.5 S |

Primary Examiner—William H. Beha, Jr.
Attorney, Agent, or Firm—Phillips, Moore, Weissenberger, Lempio & Strabala

[57] ABSTRACT

A DC to DC converter having a transformer with a primary winding, driven by an inverter circuit, and a tapped secondary winding, allowing a circuit to switch the secondary taps in accordance with the magnitude of the input voltage so that the voltage across the active part of the secondary is approximately constant irrespective of the magnitude of the input. An auxiliary secondary winding is used to provide the switching circuit a voltage proportional to the input voltage and silicon controlled rectifiers are used for switching the taps of the tapped secondary winding and for simultaneously rectifying the voltage thereacross.

7 Claims, 1 Drawing Figure

3,858,104

DC POWER CONVERTER

BACKGROUND OF THE INVENTION

This invention relates to a DC power converter that produces a substantially constant DC output voltage irrespective of the magnitude of the DC voltage input thereto, and more particularly to a converter adapted to be powered by storage batteries as exist in motor vehicles.

For powering electronic equipment in vehicles that have one or more storage batteries, it is customary to provide a converter having its input connected to such battery and its output connected to such electronic equipment. Because different vehicles have different storage battery arrangements, it is necessary that power converters be adapted to produce a given output voltage irrespective of the magnitude of the input voltage. Although power converters having manually operated input voltage range switching facilities are available, such converters are not entirely satisfactory because the operator sometimes fails to set the input range properly before connecting the converter to the vehicle, and because range switching apparatus of this type must be of heavy duty construction to accommodate the current levels involved in such apparatus.

An object of the present invention is to provide a DC power converter that automatically compensates for different input voltage levels to produce at the output a constant voltage level.

A feature and advantage of a converter employing a transformer is that the output is isolated from both the input and from the chassis or case in which the power supply is mounted. Thus, should the input to the converter be across a non-grounded storage battery that is one of several in a series string, the output voltage of the converter still is useful in providing power to the electronic equipment.

Another feature and advantage arising from employment of a transformer is that the number of turns in the secondary winding associated with the gating and control circuit can be established to increase the voltage variation over that occurring at the DC input of the converter so as to increase the sensitivity and ease with which voltage variations are detected and employed to effect switching of the taps of the other secondary winding. In the specific embodiment of the invention described in detail hereinbelow, there is a two-to-one turns rtio between the secondary and primary winding.

Still another feature and advantage of the present invention is that the inverter circuit that drives the transformer primary winding is adapted to oscillate efficiently over a broad range of input voltage levels. In order to afford this advantageous characteristic, the present invention includes an auxiliary winding on the transformer that supplies bias current to the active elements, e.g. transistors, in the inverter. Current flow through the auxiliary winding is regulated in accordance with the magnitude of the input voltage so that the bias supply to the inverter is within a range to afford efficient operation of the inverter throughout all expected voltage input levels.

Yet another feature and advantage of the present invention resides in the employment of silicon controlled rectifiers as switching elements to select the appropriate taps on the secondary power winding. The silicon controlled rectifiers perform the dual functions of switching and rectifying the secondary voltage.

SUMMARY OF THE INVENTION

This object is achieved by providing a transformer having a primary winding connected to an inverter that is driven by the DC input voltage with at least two secondary transformer windings, one of the latter having a gating and control circuit that responds to the voltage across such secondary winding, which is proportional to the input voltage, to produce one of two or more gating signals so the other secondary winding which is tapped at various intervals with taps allows the taps to be switched by the gating and control circuit in accordance with the range of voltage detected thereby eliminating the need for manual range switching.

DESCRIPTION OF THE DRAWING

The foregoing together with other objects, features and advantages will be more apparent after referring to the following specification and accompanying drawing in which.

DESCRIPTION OF A PREFERRED EMBODIMENT

Figure 1:
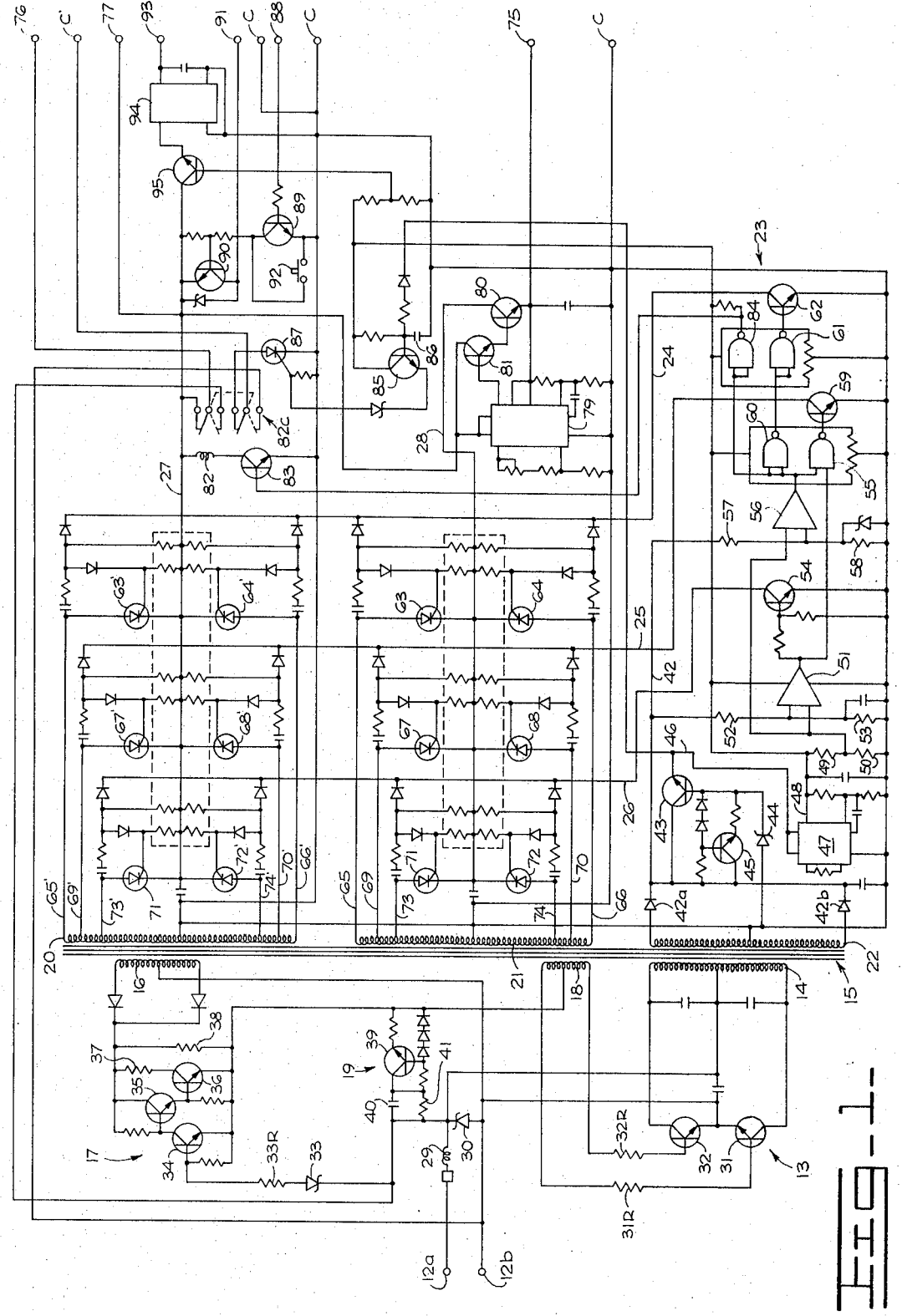
FIG. 1 is a schematic diagram of a circuit exemplifying the present invention.

Referring more particularly to the drawing, reference numeral 12a indicates the positive DC input terminal and reference numeral 12b indicates the negative DC input terminal to the circuit. Typically, terminals 12a and 12b are connected to a storage battery in a motor vehicle, and as will appear, the circuit is adapted to provide a constant output whether the input terminals are connected across one, two or three 12 volt batteries. The voltage supply to the input terminals drives an oscillator circuit 13 which includes in its output a primary winding 14 of a transformer 15. Transformer 15 also includes a winding 16 which in conjunction with an auto biasing network 17 and a transformer winding 18 provides bias current to inverter 13 that is of appropriate magnitude irrespective of the magnitude of the voltage applied to input terminals 12a and 12b. Also included at the input of the converter is a starting circuit 19 which assures proper starting and biasing of inverter 13 irrespective of the magnitude of the voltage connected to the input of the converter.

Transformer 15 also includes secondary power windings 20 and 21 and a secondary control winding 22. The voltage induced in secondary control winding 22 is proportional to the voltage developed across primary winding 14 which in turn is proportional to the magnitude of the DC voltage applied to input terminals 12a and 12b. A detecting and gating circuit 23 is connected to secondary control winding 22 and acts to switch taps on secondary power windings 20 and 21 in accordance with the magnitude of the input voltage. Gating and control circuit 23 includes three gating leads only one of which is active at a given time. There is a low voltage gating lead 24, an intermediate voltage gating lead 25 and a high voltage gating lead 26. As will apear in more detail hereinbelow, the particular lead that is active at any given time selects the taps on windings 20 and 21 so as to adjust the output voltages on respective power output conductors 27 and 28. The voltage on output conductors 27 and 28 is subjected to further regulation, but because the range of voltages that will appear on the output conductors is narrow, such regulators are of relatively uncomplex form.

In more specific detail, the circuit of FIG. 1 includes in series with input terminal 12a, a reverse polarity protecting relay 29. On the side of the relay remote from terminal 12a is connected one terminal of a Zener diode 30, the other terminal of which is connected to input terminal 12b. When input terminal 12a is connected to a potential positive with respect to input terminal 12b, the diode is back biased and circuit operation proceeds normally. When, however, input terminal 12b is connected to a potential greater than input terminal 12a, Zener diode conducts and energizes relay 29 to disconnect the circuit and avoid damage thereto.

Inverter 13 is conventional and includes two transistors 31 and 32 having common emitter connections connected to input terminal 12b and collector connections connected to opposite ends of winding 14. Winding 14 is center tapped and connected to input terminal 12a. The base bias to transistors 31 and 32 is supplied through bias resistors 31R and 32R from the opposite ends of transformer winding 18. The magnitude of the voltage induced on winding 18 is determined by auto-biasing network 17 and for this purpose a center tap of winding 18 is connected to the auto-biasing circuit. The input to the auto-biasing circuit is from input terminal 12a through a Zener diode 33 and a series resistor 33R. Such input is connected to a transistor 34 connected in common emitter configuration. The output of transistor 34 is connected to a transistor 35 connected as an emitter follower to a transistor switch 36 which has in its collector circuit a load resistor 37. In parallel with the series combination of transistor 36 and load resistor 37 is a second load resistor 38. Rectified current from winding 16 is connected to the center tap of winding 18 through resistor 38 when transistor 36 is cut off and through the parallel combination of resistors 37 and 38 when transistor 36 is conducting. For input voltages above approximately 19 volts, Zener diode 33 conducts and turns transistor 34 on and transistors 35 and 36 off. During this circuit condition, bias current is controlled solely by resistor 38. When the input voltage is below 19 volts, Zener diode 33 no longer conducts in consequence of which transistor 34 is cut off, and transistors 35 and 36 are turned on. In this circuit condition, resistors 37 and 38 are in parallel and therefore control the bias current from winding 16 to winding 18. Thus, for all input voltages to input terminals 12a and 12b transistors 31 and 32 in inverter 13 are properly biased to afford efficient operation of the inverter circuit.

Because the auto-biasing network 17 operates only in response to oscillation of inverter 13, a special starting circuit 19 is required. The starting circuit includes a transistor 39 in the collector circuit of which is a capacitor 40 in parallel with a resistor 41. Without power connected to the input terminals resistor 41 holds capacitor 40 in a discharged condition. Upon application of power to the input terminals, transistor 39 becomes a constant current regulator as the charge on capacitor 40 builds up and therefore provides sufficient biasing current over a long enough period of time to initiate the switching action of transistors 31 and 32 in inverter 13. Because transistor 39 acts as a current regulator it limits the starting bias current over the entire input voltage range and controls the time required to charge capacitor 40 so that the starting capability is restored.

Thus, the input circuitry assures that inverter 13 operates efficiently at all input voltage ranges across input terminals 12a and 12b. The voltage induced by the inverter across transformer winding 14 is proportional to the magnitude of the input voltage, and there is induced in secondary transformer winding 22 a voltage that is likewise proportional to the magnitude of the input voltage.

The voltage induced across secondary winding 22 is rectified by diodes 42a and 42b and appears on a conductor 42. The voltage on conductor 42 is connected to a pre-regulator circuit composed of a transistor 43 functioning as a series pass pre-regulator. The output of transistor 43 is controlled by a Zener diode 44 connected between the center tap of secondary transformer winding 22 and the base of transistor 43. A transistor 45 functions as a constant current regulator; the transistor provides a base current for transistor 43 and supplies the Zener current to diode 44. This arrangement is superior to a simple dropping resistor because of the improvement in efficiency, afforded at high output voltages. The output of the pre-regulator appears on a conductor 46 and varies only slightly as the input voltage to the converter varies. Such output voltage is applied to a voltage regulator 47 which in one circuit designed according to the present invention is an integrated circuit arranged to produce at the output 48 a reference voltage of 15 volts. Because of the action of the pre-regulator and regulator circuit 47, the voltage on output conductor 48 remains constant irrespective of the magnitude of the input voltage supplied to terminals 12a and 12b. As will appear subsequently this constant voltage is used as a reference voltage and is compared with the magnitude of the input voltage by gating and control circuit 23 to select the appropriate taps on secondary windings 20 and 21.

A voltage divider composed of precision resistors 49 and 50 affords selection of a predetermined portion of the reference voltage, e.g. one-half, and supplied such voltage to one input terminal of a voltage comparator 51. The other input terminal of voltage comparator 51 is connected via a voltage divider composed of resistors 52 and 53 to detect a portion of the voltage produced across secondary winding 22. Voltage comparator 51 is arranged to produce a high output so long as the voltage on winding 22 is less than the reference voltage and to produce a low output when the input voltage exceeds the reference voltage. In one circuit designed according to the present invention, resistors 52 and 53 are proportioned such that the output of comparator 51 remains high until the voltage applied to input terminals 12a and 12b exceeds about 31 volts, at which point the output goes low. Such output controls a transistor 54, the emitter-collector circuit of which is in series with high voltage control lead 26. Such output also goes to one input of a NAND gate 55. The other input of NAND gate 55 is connected to the output of a second voltage comparator 56 which compares the reference voltage from the voltage divider formed by resistors 49 and 50 with a portion of the voltage across secondary winding 22, the specific portion being established by a voltage divider network composed of resistors 57 and 58. In the exemplary circuit referred to above, resistors 57 and 58 are proportioned such that the output of comparator 56 switches from low to high when the voltage applied to input terminals 12a and 12b reaches a magnitude of about 19 volts. At voltages below 19 volts the output of comparator remains low. The output of NAND gate 55 controls a transistor switch 59, the emitter-collector circuit of which is connected in series with intermediate voltage gating lead 25.

The output of comparator 56 is also connected to both inputs of a NAND gate 60, the output of which is connected to both inputs of a NAND gate 61. The output of NAND gate 61 is connected to a transistor 62, the emitter-collector circuit of which is in series with low voltage gating lead 24.

Gating and control circuit 23 functions to turn off one of transistors 54, 59 or 62 in one of gating leads 26, 25 or 24, respectively. Transistor 54 is turned off at input voltages above 31 volts because comparator 51 is turned off for input voltage above 31 volts. Transistor 59 is turned off at input voltages ranging from 19 to 31 volts because comparators 51 and 56 are both on in that range and the outputs of the comparators are NANDed by NAND gate 55 to cut off transistor 59. Transistor 62 is turned off for input voltages below 19 volts because comparator 56 is off in the lowest range and its output is twice NANDed (by NAND gates 60 and 61) before connection to transistor 62.

The switching circuit elements associated with secondary power windings 20 and 21 are substantially identical and therefore only one will be described in detail, the other bearing corresponding reference numerals that are primed. The control circuit associated with winding 21 includes a first pair of silicon controlled rectifiers (SCR hereinafter) 63 and 64. The respective cathode terminals of the SCRs are connected to power output conductor 28 and the anodes are connected to end taps 65 and 66 of transformer winding 21. The gate terminals of SCR 63 and 64 are connected through appropriate gate current limiting elements to control lead 24. When transistor 62 is turned off, SCRs 63 and 64 are active to conduct a full wave rectified signal to output conductor 28.

A second pair of SCRs 67 and 68 have their cathode terminals connected to power output conductors 28 and their anode terminals connected to respective intermediate voltage taps 69 and 70 of winding 21. SCRs 67 and 68 are caused to conduct in response to cut-off of transistor 59 in control lead 25.

Finally, there is a third pair of SCRs 71 and 72 that have their cathodes connected to power output conductor 28 and their anodes connected to respective inner voltage taps 73 and 74 on winding 21. Accordingly, it will be seen that as the voltage on the primary of transformer 15 increases in response to increase of the input voltage supplied to terminals 12a and 12b, a smaller proportion of such voltage is employed in the secondary by appropriate selection of the taps on secondary winding 21.

The specific embodiment of the converter shown in FIG. 1 is adapted to provide a regulated 5 volt level at an output terminal 75 which is employed to drive logic circuitry in the electronic equipment to which the converter supplies power. The converter is also adapted to produce a 12 to 15 volt signal on output terminals 76 and 77 and a 180 volt signal at output terminal 93.

To provide the 5 volt signal on terminal 75, winding 21 and the circuit elements associated therewith are designed to produce on output conductor 28 a voltage of about 11 volts. Such voltage is regulated at 5 volts by an integrated circuit voltage regulator element 79, there being a series pass transistor 80 and a driver transistor 81 powered by the 11 volts on conductor 28 and controlled by integrated circuit 79 to maintain the voltage on output terminal 75 at 5 volts. Such regulation is achieved without undue consumption of power because the voltage on output conductor 28 is at or near 11 volts irrespective of the DC voltage supplied to input terminals 12a and 12b.

The operation of the invention in maintaining the voltage on output conductor 28 at 11 volts, irrespective of the DC voltage level at input terminals 12a and 12b, is as follows: Connection of input terminals 12a and 12b across one or more storage batteries at the correct polarity so as to avoid operation of circuit protector 29 causes inverter 13 to commence running. Starting circuit 19 assures proper starting of the inverter, and biasing network 17 assures that the inverter is correctly biased over a wide range of input voltages to input terminals 12a and 12b. To understand the operation of the circuit, it can be assumed that the input voltage supplied to the input terminals 12a and 12b can be in one of three ranges, which include a low range of from about 12 volts up to about 19 volts, an intermediate range of about 19 volts up to about 31 volts, and a high range of above 31 to about 40 volts. The voltage across secondary winding 22 is of a magnitude corresponding to the input voltage, but in the specific example disclosed in the drawing, there is a two-to-one turns ratio between secondary winding 22 and primary winding 14 so that the voltage sensed by gating and control circuit 23 is larger than the input voltage since it is desirable to maintain voltage to regulator 47 above 15 volts. Resistors 52 and 53 are chosen with respect to the reference voltage developed across the voltage divider formed by resistors 49 and 50 so that, so long as the input voltage is less than about 31 volts, voltage comparator 51 has a low output potential representing an off condition. Resistors 57 and 58 are chosen so that voltage comparator 56 produces a low voltage corresponding to an off condition until the input voltage reaches about 19 volts; for input voltages about 19 volts the output of voltage comparator 56 is high corresponding to an on condition. Thus, when the input voltage is below 19 volts, for example, 12 volts, switching transistor 54 is maintained in an on condition so that the gate terminals of SCR 71 and 72 cannot turn the SCRs on. Voltage comparator 56 is arranged so that its output is low or off until the voltage input thereto from the voltage divider composed of resistors 57 and 58 exceeds about 19 volts. Accordingly, transistor 59 is maintained in the on condition by virtue of the fact that NAND gate 55 has a high input and a low input. Switching transistor 62, however, is turned off because the cascade connection of NAND gates 60 and 61 produce at the input of the transistor the same condition that exists at the output of voltage comparator 56, a condition equivalent to an off condition for voltages below 19 volts. Thus, when the input voltage is below 19 volts, transistor 62 is off so that the gates of SCRs 63 and 64 rise to a level sufficient to turn the SCRs on. When the SCRs 63 and 64 are on the maximum voltage across secondary winding 21 is connected to voltage output conductor 28 and the turns ratio between secondary winding 21 and primary winding 14 is such that the desired voltage exists on output conductor 28.

When the input voltage to input terminals 12a and 12b rises to a level within the range of about 19 volts to about 31 volts (typically 24 volts when the input terminals are connected across two 12 volt batteries in series), voltage comparator 56 senses this level of voltage and the output of voltage comparator 56 goes high or to the on condition. When the circuit is in this condition, both inputs of NAND gate 55 are high so that the output thereof is low and transistor 59 is turned off. Concurrently, transistor 62 is turned on so as to cut off SCRs 63 and 64. Turning off transistor 59 causes SCRs 67 and 68 to turn on so that the output voltage is taken across only a portion of winding 21, the portion between intermediate taps 69 and 70. Thus, even though the input voltage has increased, there is no corresponding increase in the voltage on power output conductor 28 whereby the voltage regulation circuitry constituted by integrated circuit 79 and transistors 80 and 81 can maintain the voltage on output terminal 75 at the desired level without undue power consumption.

When the voltage supplied at input terminals 12a and 12b increases to a level about 31 volts (typically 36 volts when the input terminals are connected across three 12 volt batteries in series), voltage comparator 51 is turned off so that the output thereof similarly turns off transistor 54 and permits SCRs 71 and 72 to conduct. Accordingly, the output voltage is taken across taps 73 and 74 so that there is a reduction in secondary voltage on conductor 28 to compensate for the increased voltage at the primary of transformer 15. When the output of voltage comparator 51 goes to a low condition, NAND gate 55 causes transistor 59 to turn on and transistor 62 remains on because voltage comparator 56 does not change states when the input voltage passes the 31 volt level.

It will thus be seen that the portion of secondary winding 21 across which the output power is taken varies inversely with the magnitude of the input voltage so that the level of voltage existing on output conductor 28 remains at approximately the same magnitude irrespective of the voltage at input terminals 12a and 12b.

Because the switching circuitry associated with transformer secondary winding 20 and output conductor 27 is also connected to gating leads 24, 25 and 26, the SCRs in the latter switching circuit follow the sequence of operations described next above.

In the embodiment disclosed in the drawing, secondary winding 20 and its associated circuitry are adapted so as to produce on output conductor 27 a voltage in the range of about 12 – 15 volts. When the input is within this range, the output of output terminal 76 is taken directly from the input and not from conductor 27. For effecting this mode of operation, there is a relay coil 82 with which is associated double pole, double throw contacts 82c. In series with relay coil 82 is a switching transistor 83, the case of which is connected to a NAND gate 84. The output of NAND gate 84 is high only when the voltage comparator 56 senses that the input voltage is less than 19 volts; when the output of the NAND gate is high, transistor 83 conducts so that relay coil 82 is energized and the contacts 82c are in the position designated by broken lines in the Figure. In the such condition output terminal 76 is directly connected through the contacts 82c to input terminal 12a so that output terminal 76 is directly driven by the source to which the converter is connected. Common terminal C' is also connected to the center tap of winding 20, i.e. to common terminal C. At voltages above about 19 volts, however, the output of voltage comparator 56 goes up, the output of NAND gate 84 goes down, and transistor 83 is turned off. Relay coil 82 is thereby de-energized, causing contacts 82c to assume the position designated by solid lines as shown in the Figure. In the latter position, output terminal 76 is connected to conductor 27 associated with secondary power winding 20. There is also an output terminal 77 which bypasses relay 82 and provides an 11 – 14 volt output in all ranges.

The vehicle test equipment with which the converter of the present invetion is employed typically includes a fuel transfer pump which permits control and measurement of the fuel consumed by the vehicle on which the power supply and test equipment is used. Because such fuel transfer pump consumes substantial power, the present invention provides for a delay in actuating the pump, which delay is of a duration sufficient to permit inverter circuit 13 to reach a stable running condition before the load of the fuel transfer pump is imposed on the system. For this purpose there is a transistor 85 which has a capacitor 86 in its base circuit. The transistor is connected to the gate terminal of an SCR 87 and the circuit is arranged such that transistor 85 cannot turn on SCR 87 until a finite time after application of power to the system. During such finite time, capacitor 86 reaches an appropriate charged condition. Not until SCR 87 is turned on, is power supplied to common output terminal C'. The delay afforded by the circuit is sufficient to permit inverter 13 to reach a stable running condition before SCR 87 is turned on.

The test equipment with which the power supply can be used also includes a special purpose computer which under certain prescribed conditions activates a solenoid in the vehicle under test. The computer, when signalling for solenoid actuation is arranged to apply to a termimal 88 a positive going command signal which is connected to the base of a transistor 89. The command signal turns on transistor 89 which in turn turns on a power transistor 90 which connects power conductor 27 to a solenoid control terminal 91. Should a voltage at terminal 91 be desired at a time other than that dictated by the computer, there is a normally open pushbutton switch 93 across the output of transistor 89; closing the contacts of the pushbutton switch turns transistor 90 on and therefore connects output terminal 91 to output power conductor 27.

Finally, there is a 180 volt output terminal 93 for powering display devices or the like in the test equipment. Such output voltage is obtained by a converter 94, the input of which is supplied from conductor 27 through a regulator circuit that includes a transistor 95. Because the range of voltage variation on conductor 27 is narrow, a simple voltage regulator circuit suffices to assure that the DC input to converter 94 is constant.

In one specific circuit designed according to the present invention, the following components were employed in embodying the invention:

| Description, including Reference Numeral of Part in the Circuit | Manufacturer's Identifying Name and Number |
| --- | --- |
| Transformer 15 Winding 14 | 72 turns (center tapped) of 14 gauge wire |

| Description, including Reference Numeral of Part in the Circuit | Manufacturer's Identifying Name and Number |
|---|---|
| Winding 16 | 30 turns (center tapped) of 28 gauge wire |
| Winding 18 | 6 turns (center tapped) of 28 gauge wire |
| Winding 20 | 83 turns (center tapped) of 14 gauge wire |
| Taps 65' and 66' | 41.5 turns from the center tap |
| Taps 69' and 70' | 19.5 turns from the center tap |
| Taps 73' and 74' | 15 turns from the center tap |
| Winding 21 | 45 turns of 14 gauge wire |
| Taps 65 and 66 | 22.5 turns from the center tap |
| Taps 69 and 70 | 10.5 turns from the center tap |
| Taps 73 and 74 | 8.25 turns from the center tap |
| Winding 22 | 144 turns (center tapped) of 28 gauge wire |
| Reverse polarity protecting relay 29 | Airpax circuit protector AP-1-1-5 of -103-T |
| Voltage Regulators 47 and 79 | Fairchild No. ua 723 |
| Voltage Comparators 51 and 56 | Signetic No. N-558V |
| NAND gates 55, 60, 61 and 84 | Motorola No. MC-668P |
| DC Converter 94 | Shane Industries, Mini-converter MB3-12-190 |

Thus, it will be seen that the present invention provides a DC to DC power converter that automatically compensates for varying input voltages without requiring manual range switching. Additionally, the converter is adapted, because of the presence of transformer 15 to isolate the converter circuit and the apparatus connected to it from the input. These advantages are achieved electronically so that excessive power dissipation and consequent overheating are avoided. Although one embodiment of the invention has been shown and described, it will be obvious that other adaptations and modifications can be made without departing from the true spirit and scope of the invention.

What is claimed is:

1. A direct current power converter for providing a substantially constant DC voltage output irrespective of the DC input voltage thereto, said power supply comprising a transformer having at least a primary winding, a secondary winding and an auxiliary winding, inverter means connected to said primary winding for generating an alternating current therein that has a magnitude proportional to the input voltage so as to induce in said secondary winding a voltage proportional to the input voltage, said inverter means including an oscillator powered by said DC input voltage and connected to said auxiliary winding to provide bias current thereto so that said inverter means induces in said primary winding an alternating current proportional to the magnitude of the input voltage, said secondary winding having a relatively high voltage tap and a relatively low voltage tap, sensing means for sensing the magnitude of the input voltage, first switching means responsive to said sending means for effecting connection of said high voltage tap to the output when the input voltage is below a preselected magnitude, and second switching means responsive to said sensing means for effecting connection of said low voltage tap to the output when the input voltage is above the preselected magnitude.

2. A power converter according to claim 1 including means for starting said oscillator, said starting means including a capacitive charging circuit connected to said auxiliary winding.

3. A power converter according to claim 1 wherein said input sensing means includes a sensing winding on said transformer, a reference voltage source, means for comparing the voltage across said sensing winding with the reference voltage, means for activating said first switching means when the voltage applied to said comparing means from said sensing winding is less than the voltage applied to said comparing means from said reference voltage source, and means for activating said second switching means when the voltage applied to said comparing means from said sensing winding exceeds the voltage applied to said comparing means from said reference voltage source.

4. A power converter according to claim 3 wherein said first and second switching means respectively comprise first and second controlled rectifiers each having a gate terminal, said activating means for said first switching means including a first transistor switch in series with said gate terminal of said first rectifier, said activating means for said second switching means including a second transistor switch in series with the gate terminal of said second rectifier, and means for controlling said first and second transistors in response to said comparing means.

5. A direct current power converter for providing a substantially constant DC voltage output whether the DC input is in a first, second or third voltage range comprising a transformer having at least a primary winding, a secondary power winding, an auxiliary winding and a secondary sensing winding, inverter means connected to said primary winding for generating an alternating current therein that has a magnitude proportional to the input voltage so as to induce in said secondary windings a voltage proportional to the input voltage, said inverter means including an oscillator powered by said DC input and connected to said auxiliary winding to provide a bias current thereto so said inverter means introduces into said primary winding an alternating current proportional to the magnitude of said input voltage, means connected to said secondary sensing winding for producing a first control signal when the input voltage is within the first range, a second control signal when the input voltage is within the second range and a third signal when the input voltage is within the third range, said secondary power winding having a first high voltage tap, a second intermediate voltage tap and a third low voltage tap, first connecting means responsive to said first control signal for connecting said first tap to the output, second connecting means responsive to the second control signal for connecting said second tap to the output, and third connecting means responsive to said third control signal for connecting said third tap to the output.

6. A power converter according to claim 5 wherein said first connecting means comprises a first silicon controlled rectifier in series with said first voltage tap, said first silicon controlled rectifier having a gate terminal connected to said control signal producing means to be activated by said first control signal, wherein said second connecting means comprises a second silicon controlled rectifier in series with said second voltage tap, said second silicon controlled rectifier having a gate terminal connected to said control signal producing means to be activated by said second control signal, and wherein said third connecting means comprises a third silicon controlled rectifier in series with said third voltage tap, said third silicon controlled rectifier having a gate terminal connected to said control signal producing means to be activated by said third control signal.

7. A power converter according to claim 6 wherein said control signal producing means comprises means for producing a constant reference voltage, first comparing means for comparing the reference voltage with the voltage across said sensing winding and producing a first on signal when the input voltage is in the first and second ranges, second comparing means for comparing the reference voltage with the voltage across said sensing winding and producing a second on signal when the input voltage is in the second and third ranges, means connecting said first comparing means to the gate of said third silicon controlled rectifier, means connecting said second comparing means to the gate of said first silicon controlled rectifier, means for gating the outputs of said comparing means to produce a third on signal that is a NAND function of said comparators, and means connecting said gating means to the gate of said second silicon controlled rectifier.

* * * * *